United States Patent
Analetto et al.

(10) Patent No.: US 9,433,954 B2
(45) Date of Patent: Sep. 6, 2016

(54) FOAM GENERATOR, NOZZLE FOR A FOAM GENERATOR AND CARWASH HAVING A FOAM GENERATOR

(71) Applicant: Sonny's Enterprises, Inc., Tamarac, FL (US)

(72) Inventors: Anthony Analetto, Weston, FL (US); Paul Fazio, Plantation, FL (US)

(73) Assignee: Sonny's Enterprises, Inc., Tamarac, FL (US)

( * ) Notice: Subject to any disclaimer, the term of this patent is extended or adjusted under 35 U.S.C. 154(b) by 264 days.

(21) Appl. No.: 13/770,348

(22) Filed: Feb. 19, 2013

(65) Prior Publication Data
US 2014/0231545 A1 Aug. 21, 2014

(51) Int. Cl.
*A62C 31/02* (2006.01)
*B05B 7/00* (2006.01)
*B01F 5/06* (2006.01)
*B01F 3/04* (2006.01)
*B60S 3/04* (2006.01)
*B01F 15/02* (2006.01)

(52) U.S. Cl.
CPC ......... *B05B 7/0025* (2013.01); *B01F 3/04446* (2013.01); *B01F 5/0614* (2013.01); *B01F 5/0693* (2013.01); *A62C 31/02* (2013.01); *B01F 2015/0221* (2013.01); *B60S 3/04* (2013.01)

(58) Field of Classification Search
CPC ...................................................... A62C 31/02
USPC ............. 169/15, 14; 239/434, 461–524, 343
See application file for complete search history.

(56) References Cited

U.S. PATENT DOCUMENTS

| | | | | |
|---|---|---|---|---|
| 3,428,985 A | * | 2/1969 | Boyd | A47L 11/325 15/50.3 |
| 3,618,856 A | * | 11/1971 | Sachnik | 239/8 |
| 4,366,081 A | | 12/1982 | Hull | |
| 4,383,935 A | * | 5/1983 | Hull | A47L 11/325 134/123 |
| 4,925,109 A | | 5/1990 | Flanagan et al. | |
| 5,445,226 A | * | 8/1995 | Scott | B05B 7/0056 169/15 |
| 6,276,459 B1 | * | 8/2001 | Herrick | A62C 5/02 169/14 |
| 7,207,501 B2 | * | 4/2007 | Hanratty | A62C 5/02 169/14 |
| 2007/0158467 A1 | * | 7/2007 | Knowles et al. | 239/398 |

OTHER PUBLICATIONS

New Wave Innovations, Home of Turbo Foam Technology, Easy Clean Generator, URL: Http://newwaveinnovations.us/index.html.

* cited by examiner

*Primary Examiner* — Arthur O Hall
*Assistant Examiner* — Christopher R Dandridge
(74) *Attorney, Agent, or Firm* — Laurence A. Greenberg; Werner H. Stemer; Ralph E. Locher

(57) ABSTRACT

A foam generating system for an automated carwash contains a foam generator for connecting to an air source, a water source and a detergent source. The foam generator has an input and an output outputting a foaming fluid formed from air from the air source, water from the water source, and a detergent from the detergent source. A detergent/water receiving input nozzle is attached to an input side of the foam generator. An agitating nozzle is disposed in the output of the input nozzle. The agitating nozzle spins and accelerates the foaming fluid flowing through the foam generator where it eventual is output by an output nozzle. The agitating nozzle outputs a homogenous full cone pattern of foaming fluid to be turned into foam.

14 Claims, 6 Drawing Sheets

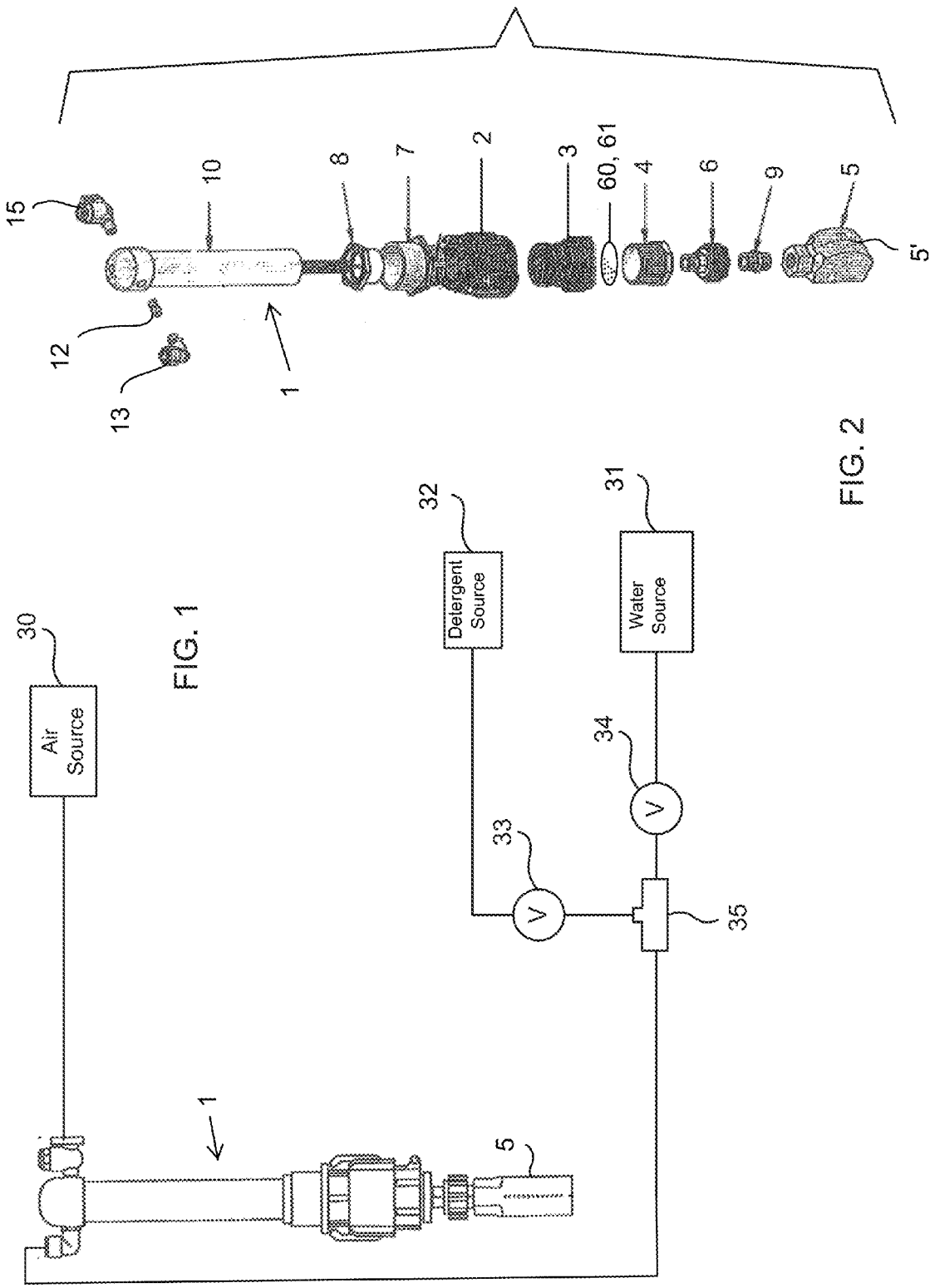

FIG. 7
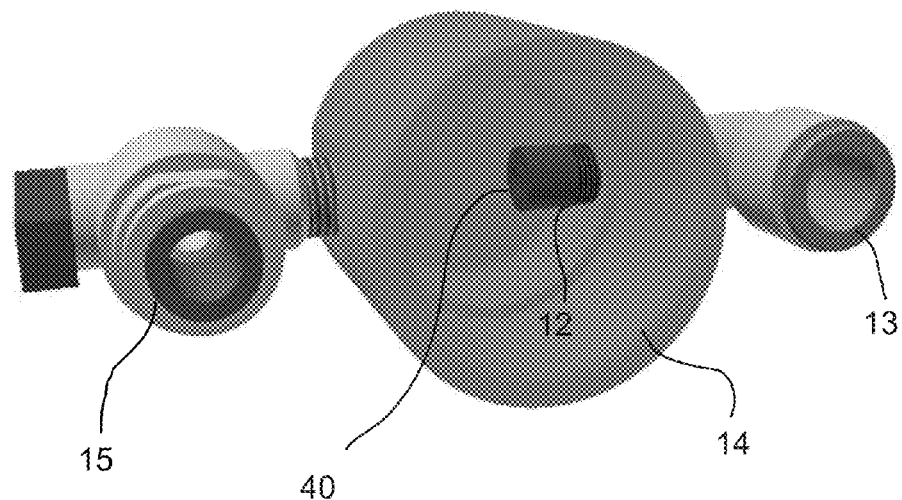
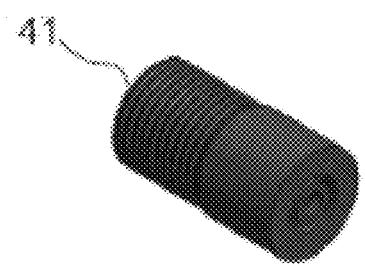
FIG. 11
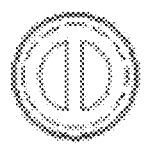
FIG. 9
FIG. 8
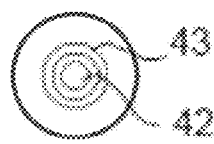
FIG. 10

FOAM GENERATOR, NOZZLE FOR A FOAM GENERATOR AND CARWASH HAVING A FOAM GENERATOR

BACKGROUND OF THE INVENTION

Field of the Invention

The invention relates, generally, to a foam generator, and more specifically, it relates to a foam generator for an automated vehicle washing unit that provides a superior foaming action.

A foaming apparatus foams a mixture of water and detergent for use in a vehicle washing unit such as the type normally used for washing cars, trucks, vans, buses, or indeed any other vehicle or device. For convenience, such washing apparatus will be referred to as a carwash apparatus hereinafter.

In washing cars, a mixture of water and detergent is applied to the vehicle and left for a period of time to enable the water-detergent mixture to penetrate through the dirt. This is then normally rinsed off with either hot or cold water. The water-detergent mixture may be hot or cold. It is important that the water-detergent mixture should remain on the vehicle for as long as possible to enable adequate penetration of any dirt. Thus, it is preferable that the water-detergent mixture should be applied to the vehicle and to adhere to the vehicle for an extended period. It has been found that where the water-detergent mixture is applied in foam form it remains as a result of surface tension for longer periods. An unfoamed water-detergent mixture, in general, runs off the vehicle and does not provide adequate penetration of surface grim.

In the past, a wide variety of devices have been developed to mix the distinct elements (e.g. air, water, soap and other cleaning chemicals) in a combined fluid for one purpose or another. Such devices have often employed pumps, mixing tanks, turbulence-generating structures and machinery, etc. In most instances, the devices produced marginally satisfactory mixing, were relatively expensive, or required relatively large amounts of chemicals and/or air to produce the desired foam. In some cases, even if a good, relatively dry foam was produced, the structure was such that the foam became compressed and very wet prior to reaching the point of its use. Finally, some prior art mixers require the use of structural production materials which cause the devices to require frequent maintenance in order to produce a consistent fluid mixture.

One application for such a mixing device has recently been found in car washes and, more particularly, in self-service car washes in which the owner of the car uses a brush, mounted on a wand, to spread and rub a cleaning fluid on the car. In those applications, the car wash builder and/or owner usually provide a source of water mixed to some extent (usually poorly) with a soap. This fluid can be discharged through the wand and applied to the surface of the car to be washed. In most cases, the soap is drawn through a venturi or similar device into the water as the water passes the soap reservoir. This results in an inefficient mixture containing very little, if any, cleansing foam. Consequently, customers of such car washes are relatively dissatisfied with the results they achieve and often must pay for successive uses of the machine for a single washing.

As a result, a need has arisen for a device which can be utilized to mix a combined fluid, such as soap and water, preferably with air, to produce an efficiently or thoroughly mixed fluid in the form of a rich, wet cleansing foam in a simple, economical, maintenance-free manner.

SUMMARY OF THE INVENTION

It is accordingly an object of the invention to provide a foam generator, a nozzle for the foam generator and a carwash having the foam generator that overcome the herein-mentioned disadvantages of the heretofore-known devices of this general type, which provides a superior spray pattern of foam for adhering to a vehicle to be cleaned.

With the foregoing and other objects in view there is provided, in accordance with the invention, a foam generating system for an automated carwash. The foam generating system contains a foam generator for connecting to an air source, a water source and a detergent source. The foam generator has an input and an output outputting a foaming fluid formed from air from the air source, water from the water source, and a detergent from the detergent source. An input nozzle is attached to the input of the foam generator and has an output. An agitating nozzle is disposed in the output of the input nozzle, the agitating nozzle spins and accelerates the foaming fluid flowing from the foam generator to an output nozzle. Because of the spinning and the acceleration of the foaming fluid, the foam generator is more evenly filled, thus allowing it to generate a richer foam flow.

In accordance with an added feature of the invention, the input nozzle is a full cone nozzle and together with the agitating nozzle outputs a full cone spray pattern of foam into the foam generator.

In accordance with another feature of the invention, the agitating nozzle has a circularly shaped output and an input being propeller shaped.

In accordance with an additional feature of the invention, the agitating nozzle has an input side with a propeller shaped flow guide for spinning the to be foamed foaming fluid. The propeller shaped flow guide has two propeller blades. Each of the two propeller blades has an opening formed therein. Ideally, the opening is square shaped.

In accordance with yet another feature of the invention, the foam generator has a cover and the agitating nozzle extends into the cover. The foam generator further has a foamer brush and a further foaming brush is disposed downstream of the foam generator.

In accordance with a further added feature of the invention, the full cone nozzle and the agitating nozzle are made from plastic.

In accordance with another additional feature of the invention, a quick release fitting is attached to the foam generator, the quick release fitting allows quick access to the foamer brush for maintenance purposes.

In accordance with a concomitant feature of the invention, an adjustable air nozzle is connected to the foam generator, the adjustable air nozzle is connected to the air source and controls a flow of air into the foam generator.

With the foregoing and other objects in view there is further provided, in accordance with the invention, an agitating nozzle for attaching to a foam generating system having a full cone nozzle. The foam generating system is part of an automated car wash. The agitating nozzle contains a nozzle body having an input side, an output side and an exterior thread for attaching to the full cone nozzle. The output side has an opening formed therein for outputting a fluid flow and a flow guide is disposed on an input side and forms an input of the agitating nozzle. The flow guide accelerates and spins the fluid flow. The flow guide is attached to the nozzle body.

With the foregoing and other objects in view there is additionally provided, in accordance with the invention, an automated carwash for washing cars. The automated carwash contains a water source for supplying water, an air source for supplying air, a detergent source for supplying a detergent, and a plurality of foam generators connected to the air source, the water source and the detergent source. The foam generators have an input and an output outputting a foaming fluid formed from the air, the water and the detergent. A full cone nozzle is attached to the input of each of the foam generators and has an input and an output. An agitating nozzle is disposed in the output of each of the full cone nozzles. The agitating nozzle spins and accelerates the foaming fluid flowing from the full cone nozzle into the foam generator. The full cone nozzle outputs a spray pattern of foaming fluid in a homogenous full cone pattern, the foam being generated from the foaming fluid.

Other characteristic features of the invention are set forth in the appended claims.

Although the invention is illustrated and described herein as embodied in a foam generator, a nozzle for the foam generator and a carwash having the foam generator, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

BRIEF DESCRIPTION OF THE SEVERAL VIEWS OF THE DRAWINGS

FIG. 1 is an illustration of an automated carwash having a foam generating system according to the invention;

FIG. 2 is a diagrammatic, exploded view of a foam generator assembly according to the invention;

FIG. 7 is a perspective view of a removed cap of the foam generator with an agitating nozzle and a full cone nozzle attached according to the invention;

FIG. 8 is a side view of the agitating nozzle;

FIG. 9 in a front view of the agitating nozzle showing an inlet side nozzle;

FIG. 10 is a front view of the agitating nozzle showing an outlet;

FIG. 11 is perspective view of the agitating nozzle;

DESCRIPTION OF THE PREFERRED EMBODIMENTS

Figure 4:
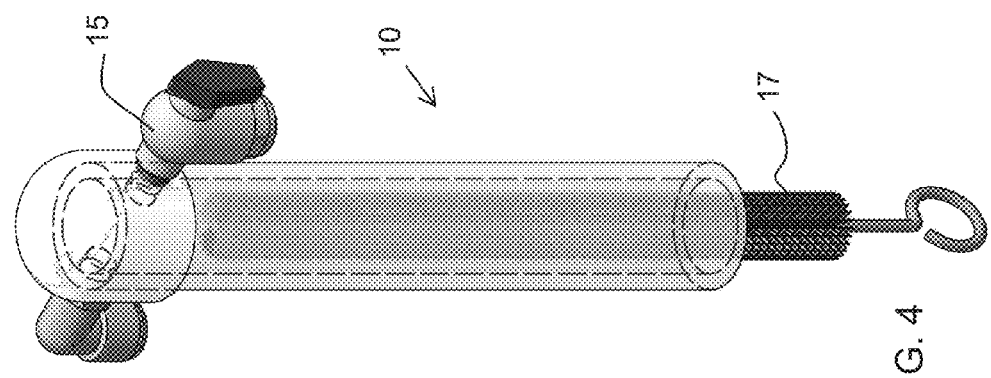
FIG. 4 is a diagrammatic, front view of the assembled foam generator according to the invention.

In all the figures of the drawing, sub-features and integral parts that correspond to one another bear the same reference symbol in each case. Referring now to the figures of the drawings in detail and first, particularly, to FIG. 1 thereof, there is shown a foam generation system having an air source 30, a water source 31, and a cleaning fluid (detergent) source 32 such as a cleaning chemical source and/or a soap source. The water and cleaning sources 31, 32 are combined via a control value 35 and pumps 33, 34 to which a plurality of foam generator assemblies 1 are attached, of which only one is illustrated. The air source 30 is also connected to the foam generator assembly 1.

Referring now to FIG. 2, the foam generator assembly 1 is shown in greater detail and includes an output 5 in the form of a foamer nozzle 5. The foamer nozzle 5 has a plurality of nozzles 5' outputting foam for adhering to a vehicle to be cleaned. The foamer nozzle 5 is fed the final foam mixture through an adjustable ball fitting 6 via a hex nipple 9, ideally a "½" hex nipple 9. The adjustable ball fitting 6 allows for adjustment of the foam supply to the foamer nozzle 5 by widening and narrowing the passage way through the adjustable ball fitting 6 and thus controlling the amount of foam mixture. Upstream of the adjustable ball fitting 6 is a bushing 4, ideally a 1½ inch by ½ inch reducing bushing 4. The main function of the reducing bushing 4 is to build some backpressure for a foam generator 10 for improving the foam output.

Connected in-line next to the reducing bushing 4 is a further foamer brush 3 for creating further agitation which produces additional foam in a partly foamed mixture. Ideally a 1¾ inch by ½ inch foamer brush 3 is used. Next in-line to the further foamer brush 3 is a gator cam lock fitting 2. The gator cam lock fitting 2 allows for a quick connection of an upper part of the foam generator 1 to a lower part. Via the gator cam lock fitting 2, the upper part and the lower part of the foam generator assembly 1 can be separated allowing for easy access to the component parts for cleaning and servicing. Ideally the gator cam lock fitting 2 is a male adapter 1½ inch female NPT. An adapter or bushing 7 and a coupling 8 connect the gator cam lock fitting 2 to the foam generator 10.

Figure 3:
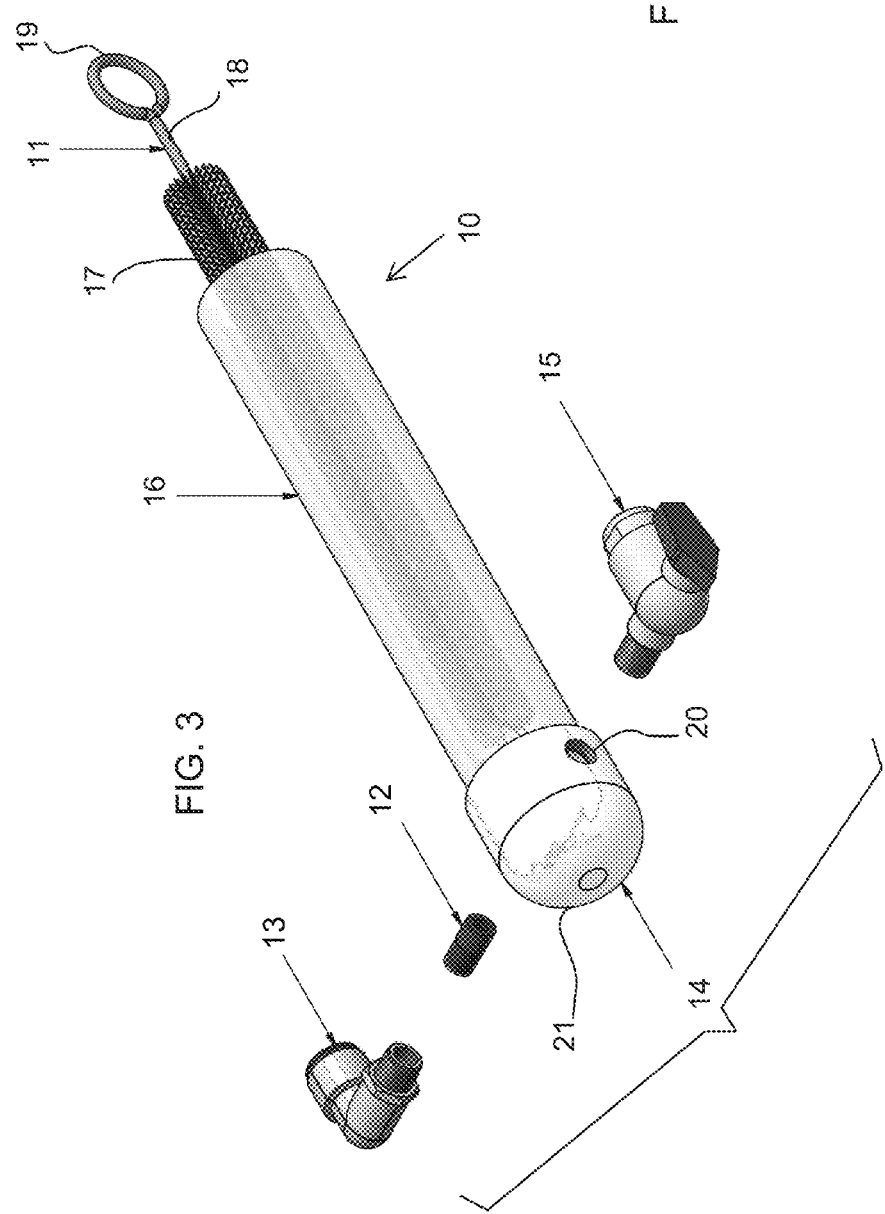
FIG. 3 is a diagrammatic, exploded view of a foam generator according to the invention.

As shown in FIG. 3, the foam generator 10 has a housing 16 formed as a pipe preferable a PVC pipe 16 or metallic pipe. Inserted in the housing 16 is a foamer brush 11 (bottle brush) ideally having a 1¾ inch diameter and being twelve inches long. The foamer brush 11 has a rod 18 and a plurality of bristles 17 made from a plastic, composite or metallic material extending from the rod 18. A first end or bottom end of the rod 18 ends in an eyelet 19 which extends out of a bottom end of the housing 16. The eyelet 19 extends into the coupling 8. The eyelet 19 allows for a quick removal and cleaning of the foamer brush 11.

A cap 14 covers a top of the housing 16. The cap 14 has two threaded openings 20, 21. In the first opening 20 an air nozzle 15 with a control valve is threaded. In the second opening 21 a machined, elbow full cone nozzle 13 is threaded. Inserted into the full cone nozzle 13, before it is threaded in, is an agitating nozzle 12. The full cone nozzle 13 outputs a full cone spray pattern at a rate of one gallon per minute at 40 psi. The agitating nozzle 12 accelerates and spins the cleaning detergent/water mixture so that it is evenly spread and starts foaming before it is output by the full cone nozzle 13 into the housing 16 of the foam generator 10. The combination of the full cone nozzle 13 and the addition of the agitating nozzle 12 creates far more foam and a more consistent foam flow than known prior art nozzles.

The air nozzle 15 is an adjustable, elbow ball valve 15 ideally being ⅜ inch. The air supply 30 is attached to the ball valve 15 and the air flow flows into the housing 16 pushing the partially foamed mixture along the foamer brush 11 for additional foaming of the foaming mixture. The foaming mixture leaves the housing 16 and is then further foamed by the further foamer brush 3 before it is output by the foamer nozzle 5.

Figure 5:
FIG. 5 is a photograph showing a foam spray pattern according to the prior art.
Figure 6:
FIG. 6 is a photograph showing a foam spray pattern utilizing the invention of the instant application.

One major aspect of the invention resolves around the addition and functioning of the agitating nozzle 12. FIG. 5 shows a spray pattern within a prior art foam generator. As shown in FIG. 5, the spray pattern is irregular and highly concentrated in the center area inside the foam generator. In contrast, FIG. 6 shows the spray pattern output within the foam generator 10 according to the invention. The spray pattern in FIG. 6 is a full cone spray pattern in which the foam is evenly distributed throughout the spray pattern and thus evenly spread out into the foam generator 10. Thus the foam mixture is ejected in a more homogenous and spread out pattern as it traverses along the first foamer brush 11.

FIG. 7 shows the cover 14 removed from the foam generator 10 exposing the agitating nozzle 12 and the full cone nozzle 13. An outlet 40 of the agitating nozzle 12 extends about ½ inch into the cover 14 of the foam generator 10.

FIGS. 8-14 show the details of the agitating nozzle 12. FIG. 11 shows a perspective view of the agitating nozzle 12. An exterior surface of the agitating nozzle 12 has an exterior thread 41 for securing to an internal thread of the full cone nozzle 13. FIG. 8 shows a side view of the agitating nozzle 12. FIG. 9 shows an inlet side of the agitating nozzle 12 and FIG. 10 shows an outlet side of the agitating nozzle 12. As shown in FIG. 10, the outlet side has two circular shaped openings or recesses 42, 43 where the opening 42 forms an outlet through which the foaming mixture is pushed out into the cover 14 and along the foamer brush 11 due to the pressure of air.

Figure 12:
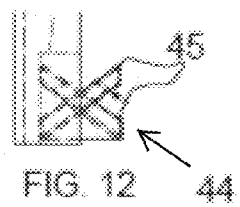
FIG. 12 is a cut away view of the agitating nozzle showing internal nozzle propeller blades.
Figure 13:
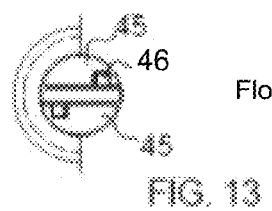
FIG. 13 is a front view of the agitating propeller nozzle.
Figure 14:
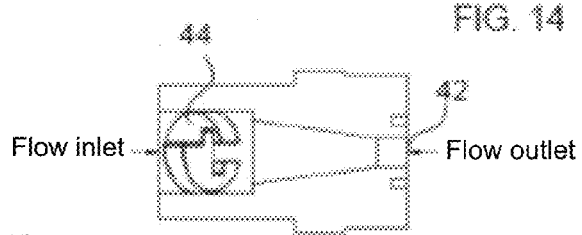
FIG. 14 is a further illustration of a further embodiment of the agitating propeller.
Figure 17:
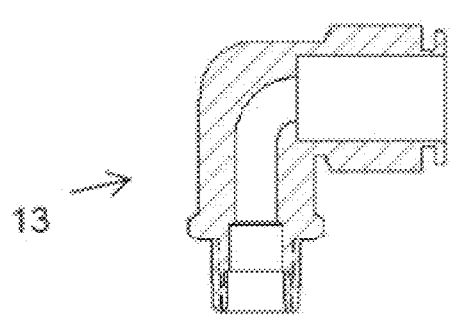
FIG. 17 is a sectional view taken along the line XVII-XVII shown in FIG. 16.
Figure 15:
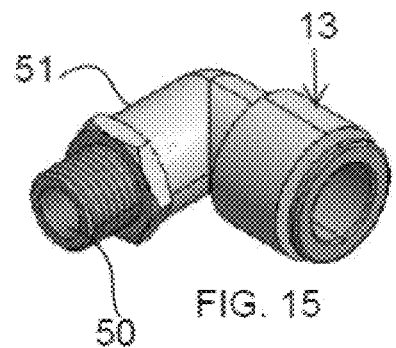
FIG. 15 is a perspective view of a full cone nozzle.
Figure 16:
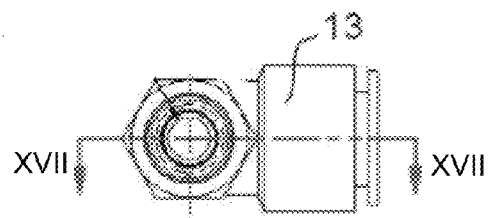
FIG. 16 is a side view of the full cone nozzle.

FIG. 12 is an internal view of the inlet side of the agitating nozzle 12 having a propeller shaped agitator or flow guide 44 with two propeller blades 45. Each of the propeller blades 45 has an opening 46 as best shown in FIG. 13. The opening 46 is ideally square shaped but may be any shape including but not limited to circular, triangular, oval, rectangular, star, etc. FIG. 14 shows a view of a further embodiment of the flow guide 44 and its relationship to the outlet opening 42. The full cone nozzle 13 has an internal thread 50 into which the agitating nozzle 12 connects (see FIG. 15). FIG. 16 shows a side view of the full cone nozzle 13 and FIG. 17 shows a sectional view of the full cone nozzle 13 taken along the section line XVII-XVII shown in FIG. 16.

The use of the agitating nozzle 12 connected to the full cone nozzle 13 improves the foam generation due to both the agitating nozzle 12 and the elbow fitting 51 of the full cone nozzle 13. As the fluid flows through the agitating nozzle 12, more specifically, through the propeller blades 45, a velocity of the flow significantly increases and the fluid is spun due to the propeller shape of the propeller blades 45. Due to the speed and spinning of the fluid flow, the fluid spreads more uniformly out of the agitating nozzle 12 providing a dramatically increased full cone spray pattern as shown in FIG. 6. More specifically, if one were to remove the agitating nozzle 12, the output from the full cone nozzle 13 would be more similar to that of FIG. 5 and less evenly spread in the foam generator 10.

The addition of the agitating nozzle 12 provides a more uniform foam flow and additional foam generation. Therefore a higher quality foam spray is generated and will adhere to a vehicle surface area in a more homogenous manner and for a longer period of time and therefore provides a superior quality car wash. In addition, the required maintenance of the form generator assemblies is reduced due to less clogging of the foam generator assemblies 1.

Figure 18:
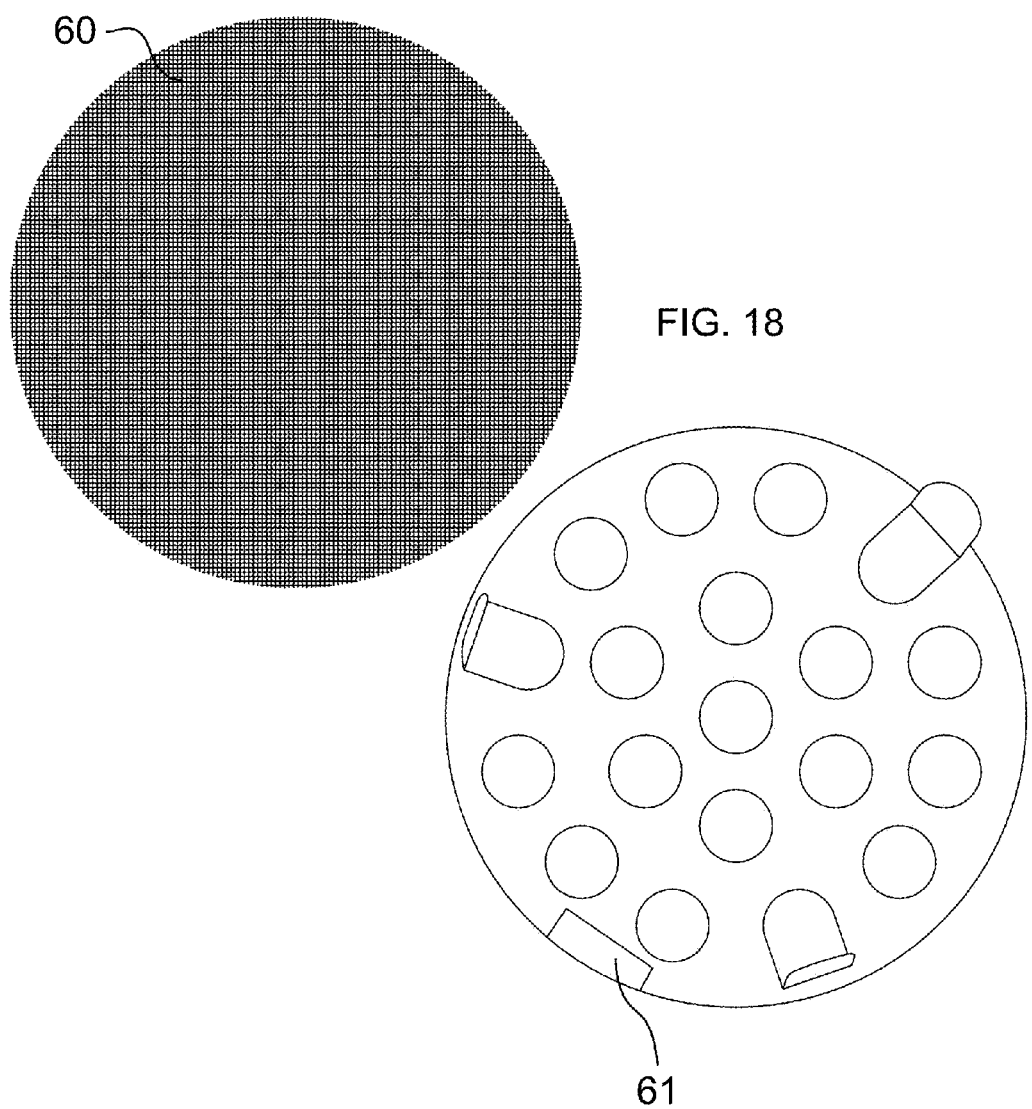
FIG. 18 is an illustration of a fine mesh screen.

FIG. 18 shows two optional mesh screens 60, 61. The mesh screens 60, 61 can be used individually or in combination. The mesh screens 60, 61 provide enhanced performance when disposed between the reducing bushing 4 and the further foamer brush 3. The mesh screens 60, 61 are ideally made of a metal, a plastic or a composite and ensure a complete mixing of the detergent, water and air. Furthermore the mesh screens 60, 61 maximize performance with regards to cleaning, lubricating and coloring.

The invention claimed is:

1. A foam generating system for an automated carwash, the foam generating system comprising:
    a foam generator for connecting to a water source and a detergent source, said foam generator having an input and an output outputting a foaming fluid formed from air, water from the water source, and a detergent from the detergent source;
    an input nozzle attached to said input of said foam generator and having an output;
    an agitating nozzle disposed in said output of said input nozzle, said agitating nozzle configured for spinning and accelerating the foaming fluid flowing from said agitating nozzle into said foam generator;
    said foam generator having a foamer brush disposed downstream of said agitating nozzle for producing foam from the foaming fluid;
    an output nozzle disposed downstream of said foam generator for outputting the foam generated from the foaming fluid.

2. The system according to claim 1, wherein said input nozzle is a full cone nozzle and together with said agitating nozzle outputting a full cone spray pattern of the foaming fluid into said foam generator, said input nozzle is directly attached to said foam generator.

3. The system according to claim 1, wherein said agitating nozzle has a circularly shaped outlet opening formed therein.

4. The system according to claim 1, wherein said agitating nozzle has an input being propeller shaped.

5. The system according to claim 1, wherein said agitating nozzle has an input side with a propeller shaped flow guide for accelerating and spinning the foaming fluid.

6. The system according to claim 5, wherein said propeller shaped flow guide has two propeller blades.

7. The system according to claim 6, wherein each of said two propeller blades has an opening formed therein.

8. The system according to claim 7, wherein said opening is square shaped.

9. The system according to claim 1, wherein said foam generator has a cover and said agitating nozzle extends into said cover.

10. The system according to claim 1, further comprising a pressurized air source connected to said foam generator for pushing the foaming fluid along said foam generator.

11. The system according to claim 10, further comprising:
    a further foaming brush disposed downstream of said foam generator and upstream of said output nozzle; and
    at least one mesh screen disposed between said foam generator and said further foaming brush.

12. The system according to claim 2, wherein said full cone nozzle and said agitating nozzle are made from plastic and are removable from each other and from said foam generator via threaded connections.

13. The system according to claim 10, further comprising a quick release fitting attached between said foam generator and said output nozzle, said quick release fitting allowing access to said foamer brush for maintenance purposes.

14. The system according to claim 2, further comprising an adjustable air nozzle connected to said foam generator, said adjustable air nozzle being connected to the air source and controlling a flow of air into said foam generator.

\* \* \* \* \*